United States Patent
Peeke et al.

(10) Patent No.: US 6,850,410 B2
(45) Date of Patent: Feb. 1, 2005

(54) ADVANCED TECHNOLOGY ATTACHMENT DISK DRIVE MODULE WITH FIBRE CHANNEL SYSTEM CHARACTERISTICS

(75) Inventors: Douglas E. Peeke, Shrewsbury, MA (US); C. Ilhan Gundogan, Lexington, MA (US); Matthew Borsini, Worcester, MA (US); Maida Boudreau, Brimfield, MA (US)

(73) Assignee: EMC Corporation, Hopkinton, MA (US)

( * ) Notice: Subject to any disclaimer, the term of this patent is extended or adjusted under 35 U.S.C. 154(b) by 125 days.

(21) Appl. No.: 10/400,333

(22) Filed: Mar. 27, 2003

(65) Prior Publication Data

US 2003/0189811 A1 Oct. 9, 2003

Related U.S. Application Data (63) Continuation-in-part of application No. 10/320,019, filed on Dec. 16, 2002, and a continuation-in-part of application No. 09/894,804, filed on Jun. 29, 2001, now Pat. No. 6,560,098.

(51) Int. Cl.[7] ................................................ G06F 1/16
(52) U.S. Cl. ........................ 361/685; 361/682; 361/752; 361/725; 312/223.1; 248/562; 439/638
(58) Field of Search ................................. 361/682, 683, 361/685, 725, 686, 751, 741, 752, 756, 788, 796, 829; 312/223.1, 223.2, 265.6, 257.1; 248/562, 636, 638, 560; 360/97.01, 97.02; 250/216, 239; 439/60, 152–153, 157, 327, 328, 331, 345, 638, 488, 928.1; 710/100, 129, 131

(56) References Cited

U.S. PATENT DOCUMENTS

| | | | |
|---|---|---|---|
| 5,603,056 A | | 2/1997 | Totani |
| 5,673,132 A | | 9/1997 | Carbone, Jr. et al. |
| 5,841,997 A | | 11/1998 | Bleiweiss et al. |
| 5,890,214 A | | 3/1999 | Espy et al. |
| 5,901,151 A | | 5/1999 | Bleiwiess et al. |
| 6,317,800 B1 | | 11/2001 | Westby et al. |
| 6,421,711 B1 | | 7/2002 | Blumenau et al. |
| 6,425,049 B1 | | 7/2002 | Yamamoto et al. |
| 6,430,714 B1 | | 8/2002 | McAdam et al. |
| 6,473,301 B1 | | 10/2002 | Levy et al. |
| 6,558,201 B1 | * | 5/2003 | Begley et al. ............... 439/638 |
| 2002/0044562 A1 | | 4/2002 | Killen, Jr. et al. |
| 2002/0046276 A1 | | 4/2002 | Coffey et al. |
| 2002/0199048 A1 | * | 12/2002 | Rabinovitz .................. 710/100 |

* cited by examiner

*Primary Examiner*—Michael Datskovsky
(74) *Attorney, Agent, or Firm*—Guerin & Rodriguez, LLP; Michael A. Rodriguez

(57) ABSTRACT

Described is an Advanced Technology Attachment (ATA) disk drive module for use in a data storage system having an enclosure with slots constructed to receive Fibre Channel disk drive modules. The ATA disk drive module comprises an ATA disk drive, an adapter board connected to the ATA disk drive, and a carrier assembly including spaced apart carrier sleds mounted to the ATA disk drive and to the adapter board. The spaced apart carrier sleds have mechanical dimensions that enable the carrier assembly to slide into an enclosure slot constructed to receive a Fibre Channel disk drive module. The adapter board provides an electrical interface and a mechanical interface between the ATA disk drive and a midplane of the enclosure when the carrier assembly is inserted in the enclosure slot and the ATA disk drive module is plugged into the midplane.

20 Claims, 7 Drawing Sheets

ADVANCED TECHNOLOGY ATTACHMENT DISK DRIVE MODULE WITH FIBRE CHANNEL SYSTEM CHARACTERISTICS

RELATED APPLICATIONS

This application is a continuation-in-part application claiming priority to U.S. patent application Ser. No. 10/320,019, filed Dec. 16, 2002, and titled "Using Request and Grant Signals to Read Revision Information from an Adapter Board that Interfaces a Disk Drive," and a continuation-in-part of U.S. patent application Ser. No. 09/894,804, filed Jun. 29, 2001, now U.S. Pat. No. 6,560,098 and titled "Disk Drive Module," the entirety of which applications are incorporated by reference herein.

FIELD OF THE INVENTION

The invention relates generally to data storage systems. More particularly, the invention relates to data storage systems that use Advanced Technology Attachment disk drive modules.

BACKGROUND

Figure 1:
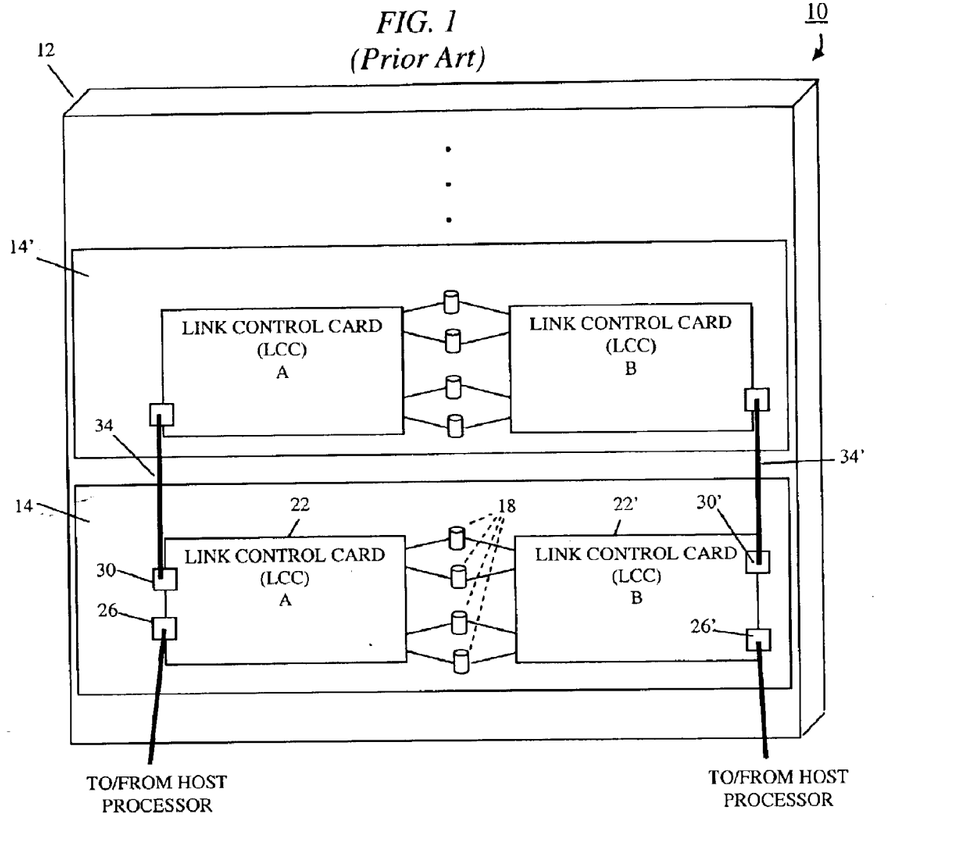
FIG. 1 is a diagram showing an example of a storage system including a plurality of enclosures connected in a Fibre Channel (FC) arbitrated loop.

Referring to FIG. 1, a typical data storage system 10 includes at least one rack 12 of storage devices or enclosures 14, 14'. The data storage system 10 can have fewer or more enclosures than those shown (internal or external to the rack 12). In general, the enclosure 14 is a storage device having a plurality of disk drive modules 18. Examples of storage devices include disk-array enclosures (DAE) and disk-array processor enclosures (DPE). A typical DAE includes a plurality of disk drive modules (e.g., fifteen), one or two link control cards (LCCs), and one or two power supplies. A typical DPE includes a plurality of disk drive modules (e.g., fifteen), one or two storage processors, one or two LCCs, and one or two power supplies. Each disk drive module 18 includes a carrier assembly that holds a disk drive and slides into a slot of the enclosure 14.

Each enclosure 14, 14' implements redundancy with an "A" side and a "B" side. In enclosure 14, for example, each side has a link control card (LCC) 22, 22' and a power supply (not shown). Reference numerals for the B side components are the same as corresponding components on the A side with the addition of a prime (') designation. Each LCC 22, 22' includes a primary communications port 26, 26' and an expansion communications port 30, 30'. The enclosures 14, 14' are connected to each other by cables 34, 34' in a loop topology. Communication signals traverse the loop in one direction and pass from enclosure 14 to enclosure 14', in a daisy-chain fashion, and then return from enclosure 14' to enclosure 14. An enclosure receiving communication signals targeted for a different enclosure forwards those signals along the loop.

A common implementation of the loop is a Fibre Channel (FC) arbitrated loop. Fibre Channel is a computer communications protocol for communicating signals at a data rate of up to 2 Gbps. In general, the FC protocol provides an interface by which host processors (and servers) communicate with the enclosures 14, 14' and with the disk drive modules 18 installed within the enclosures 14, 14'. For typical FC data storage systems, the disk drive modules 18 have FC disk drives.

Figure 2:
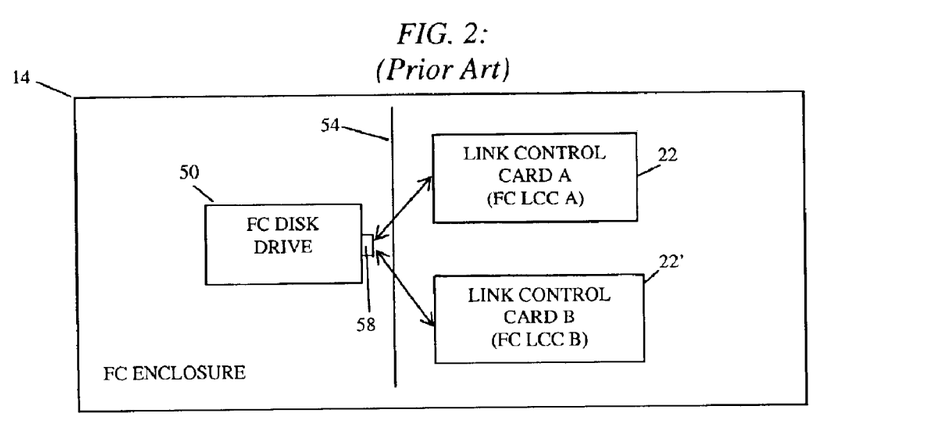
FIG. 2 is a diagram showing an example of an FC enclosure including an FC disk drive in communication with a plurality of FC link control cards (LCCs).

FIG. 2 shows the enclosure 14 having an FC disk drive 50, the A-side FC LCC 22 and the B-side FC LCC 22' of FIG. 1. The FC disk drive 50 has two ports (dual port); that is, communications with the disk drive 50 can occur over either port. The FC disk drive 50 is electrically connected to a midplane 54 by a midplane connector 58. The FC LCCs 22, 22' are also electrically connected to the midplane 54. One FC LCC 22 is in electrical communication with the FC disk drive 50 by way of one port, and the other FC LCC 22' is in electrical communication with the FC disk drive 50 by way of the other port.

Disk drive manufacturers have for many years produced another type of disk drive, called Advanced Technology Attachment (ATA) disk drives (also known as IDE disk drives), for the personal computer (PC) industry. To satisfy the high volumes and the small profit margins of PCs, the disk drive manufacturers have refined their processes to improve the reliability and storage capacity of the ATA disk drives and to reduce their cost. Typically, the cost of an ATA disk drive is two to three times lower and its storage capacity two times greater than that of an FC disk drive. Thus, the net price per storage capacity advantage for ATA disk drives can be four to six times that of FC disk drives. Consequently, ATA disk drives present an attractive adjunct to FC disk drives for storage system developers. Notwithstanding their advantages, the use of ATA disk drives in the type of data storage system described above requires some adaptations.

SUMMARY

In one aspect, the invention features an Advanced Technology Attachment (ATA) disk drive module for use in a data storage system having an enclosure with slots constructed to receive Fibre Channel disk drive modules. The ATA disk drive module comprises an ATA disk drive, an adapter board connected to the ATA disk drive, and a carrier assembly including spaced apart carrier sleds mounted to the ATA disk drive and to the adapter board. The spaced apart carrier sleds have mechanical dimensions that enable the carrier assembly to slide into an enclosure slot constructed to receive a Fibre Channel disk drive module. The adapter board provides an electrical interface and a mechanical interface between the ATA disk drive and a midplane of the enclosure when the carrier assembly is inserted in the enclosure slot and the ATA disk drive module is plugged into the midplane.

In another aspect, the invention features an adapter board for enabling an ATA disk drive module to be used in a data storage system having an enclosure with slots constructed to receive Fibre Channel disk drive modules. The adapter board comprises a first electrical connector attached to a first surface of the adapter board for connecting to an ATA disk drive and a second electrical connector attached to an opposite surface of the adapter board for connecting to a midplane of the enclosure. The second electrical connector on the opposite surface of the adapter board aligns with a corresponding connector on the midplane when an ATA disk drive module comprised of the ATA disk drive and adapter board is inserted into a slot of the enclosure. The adapter board also includes switching means for selectively controlling information flow between the ATA disk drive and one of a plurality of control boards connected to the midplane.

In yet another aspect, the invention features an Advanced Technology Attachment (ATA) disk drive module for use in a data storage system having an enclosure with slots constructed to receive Fibre Channel disk drive modules. The ATA disk drive module comprises a carrier sled, an ATA disk drive connected to the carrier sled, and a bezel assembly including a bezel and a handle used to carry the ATA disk drive module.

The handle includes a first end having a tab extending therefrom and a second end having a latch mechanism. The first end of the handle is pivotally attached to one end of the bezel for rotational movement about an axis between an open position and a closed position. The tab engages a front edge of the enclosure slot when the handle is rotated to the closed position. The latch mechanism locks the handle in the closed position to secure the bezel to the front edge of the enclosure slot. The ATA disk drive module also includes a resilient spring connecting the bezel assembly to the carrier sled. The resilient spring urges the carrier assembly towards the midplane when the bezel is secured to the front edge of the enclosure slot.

In yet another aspect, the invention features a bezel assembly for a disk drive module. The bezel assembly comprises a bezel for attaching to a carrier sled of the disk drive module and an elongated handle that can be used to carry the disk drive module. The elongated handle includes a first end having a tab extending therefrom and a second end having a latch mechanism. The first end is pivotally attached to one end of the bezel for rotational movement about an axis between an open position and a closed position. The tab engages a front edge of the enclosure slot when the handle is rotated to the closed position. The latch mechanism lock is the handle in the closed position to secure the bezel to the front edge of the enclosure slot. The bezel assembly also includes a resilient spring connecting the bezel to the carrier sled. The resilient spring urges the disk drive module into the enclosure slot when the bezel is secured to the front edge of the enclosure slot.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

An Advanced Technology Attachment (ATA) disk drive module constructed in accordance with the invention enables ATA disk drives to be used in data storage systems constructed for Fibre Channel (FC) disk drive modules, without needing to change the enclosure, midplane, or power supplies of the data storage system. This ATA disk drive module has mechanical and electrical characteristics that are substantially the same as corresponding characteristics of FC disk drive modules. Consequently, data storage systems constructed for FC disk drive modules can also accommodate ATA disk drive modules.

To achieve this compatibility, the invention takes into account various differences between FC disk drives and ATA disk drives. Such differences include: 1) FC disk drives are dual-ported, ATA disk drives are single-ported; 2) FC disk drives have a midplane connector that is aligned with and connects directly to a connector on the midplane, ATA disk drives do not; 3) FC disk drives are hot-pluggable (i.e., insertable into an enclosure slot while power is being supplied to the slot by way of the midplane), ATA disk drives are not hot-pluggable; and 4) FC disk drives provide certain output signals, such as a fault output signal and an activity output signal, ATA disk drives do not provide such output signals.

Figure 3:
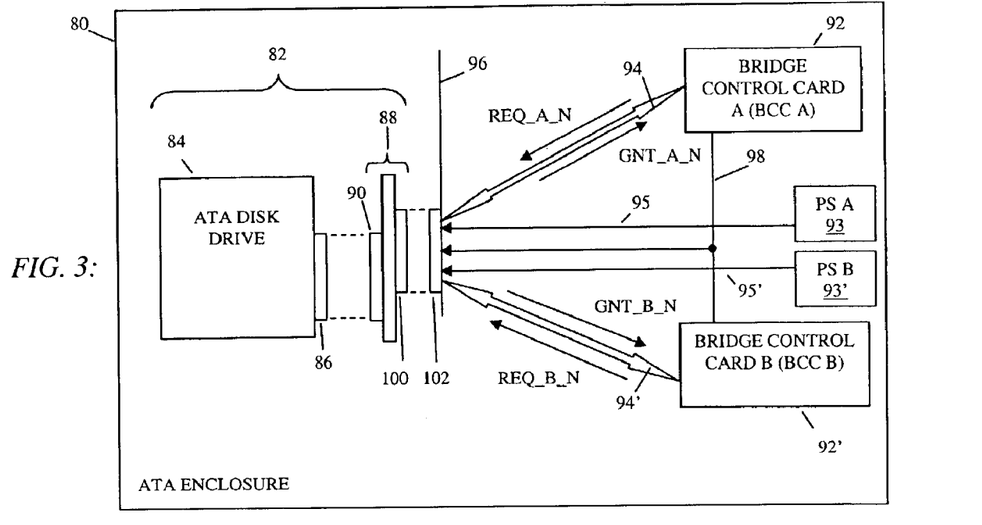
FIG. 3 is a diagram showing an embodiment of an Advanced Technology Attachment (ATA) enclosure constructed in accordance with the principles of the invention, the ATA enclosure including an ATA disk drive module and a plurality of ATA bridge control cards (BCCs).

FIG. 3 shows an embodiment of an ATA enclosure 80 constructed in accordance with the principles of the invention. The ATA enclosure 80 has an ATA disk drive module 82, an A-side side ATA bridge control card 92, a B-side ATA bridge control card 92' (generally ATA BCC 92), an A-side power supply (PS A) 93, and a B-side power supply (PS B) 93'. Typically, the ATA enclosure 80 has a plurality of ATA disk drive modules 82 (e.g., fifteen), but only one such module 82 is shown to illustrate the invention. The ATA disk drive module 82 includes an ATA disk drive 84 and an adapter board 88. The ATA disk drive 84, which can be a parallel ATA (PATA) disk drive or a serial ATA (SATA) disk drive, has a connector 86 that electrically connects to a disk drive connector 90 on one side of the adapter board 88. The adapter board 88 is electrically connected to a midplane 96 by a midplane connector 100 on the other side of the adapter board 88. The midplane connector 100 mates with a midplane connector 102 of the midplane 96.

Each ATA BCC 92, in general, operates as a communications bridge between the FC arbitrated loop and the ATA disk drive 84. The ATA BCCs 92, 92' are each in electrical communication with the midplane connector 100 through the midplane 96. The ATA BCC A 92 communicates with the adapter board 88 over signal lines 94, the ATA BCC B 92' communicates with the adapter board 88 over signal lines 94', and both ATA BCCs 92, 92' communicate with the adapter board 88 over signal line 98. Each power supply 93, 93' provides a voltage, which in one embodiment is 12 volts, to the midplane 96 over lines 95, 95', respectively.

The adapter board 88 makes the ATA disk drive module 82 mechanically and electrically compatible with an FC disk drive module, that is, the ATA disk drive module 82 has mechanical and electrical characteristics that are substantially the same as corresponding characteristics of an FC disk drive module. More specifically, to provide mechanical compatibility the ATA disk drive module 82 uses the same type of midplane connector as an FC disk drive (e.g., FC disk drive 50 of FIG. 2) to connect to a midplane; that is, the midplane connector 100 and the midplane connector 58 (FIG. 2) for the FC disk drive 50, for example, have the same number of contacts and contact configuration. As used throughout this description, the terms contact and pin are used interchangeably, and the use of either term is not intended to impose any limitation on the shape or form of the contact or pin or to limit the invention to any particular type of midplane connector (provided the ATA disk drive module uses the same type of connector used by FC disk drive module for a given enclosure). Also, the location of the midplane connector 100 on the ATA disk drive module 82 corresponds to the location of the midplane connector of an FC disk drive module. Thus, the ATA disk drive module 82, with its ATA disk drive 84 and adapter board 88, can be mechanically inserted into the same slot of an enclosure as an FC disk drive module. Other measures for achieving mechanical compatibility between FC and ATA disk drives are described below in connection with FIG. 5.

For electrical compatibility, ATA signals are assigned to particular contacts of the midplane connector 100 (referred to as signal-to-pin assignments) such that an ATA disk drive mistakenly installed in an FC enclosure does not (1) cause damage to the ATA disk drive or to the FC enclosure, or (2) disrupt the proper operation of any other disk drive in the same enclosure or of the other enclosures connected to the FC arbitrated loop. Similarly, an FC disk drive mistakenly inserted into an ATA enclosure does not (1) cause damage to the FC disk drive or to the ATA enclosure, or (2) disrupt the proper operation of any other disk drive in the same enclosure or of the other enclosures connected to the FC arbitrated loop. Details for achieving this electrical compatibility are described in U.S. patent application Ser. No. 10/320,212, filed Dec. 16, 2002, and titled "Compatible Signal-to-Pin Connector Assignments for Usage with Fibre Channel and Advanced Technology Attachment Disk Drives," the entirety of which application is incorporated by reference herein.

The ATA disk drive 84 is a single port device, and thus for each ATA BCC 92 to communicate with the ATA disk drive 84, that ATA BCC 92 issues a request signal to the adapter board 88 and expects to receive a grant signal from the adapter board 88 in reply. The adapter board 88 arbitrates between the ATA BCCs 92, 92' through the use of the request and grant signals to determine which ATA BCC 92 can currently communicate with the ATA disk drive 84. FIG. 3 shows the exchange of the request signals and grant signals (REQ_A_N and GNT_A_N) between the adapter board 88 and the BCC A 92 over signal lines 94 and of request signals and grant signals (REQ_B_N and GNT_B_N) between the adapter board 88 and the BCC B 92' over signal lines 94'.

Figure 4:
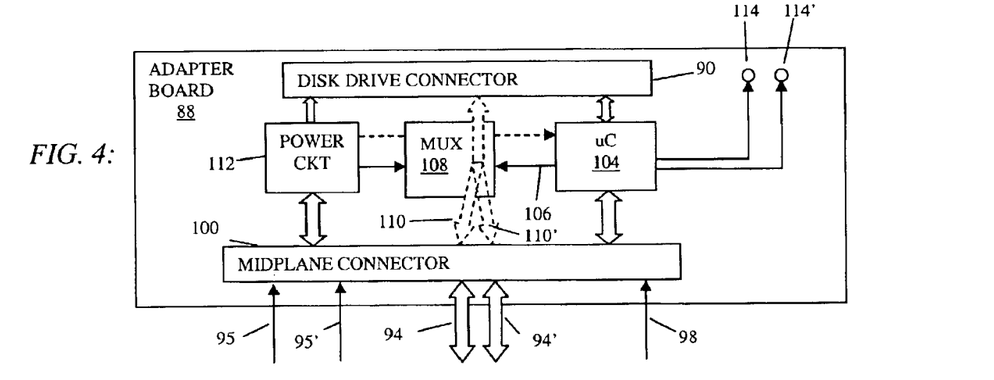
FIG. 4 is a diagram showing an embodiment of an adapter board of the invention.

FIG. 4 illustrates a general overview of an embodiment of the adapter board 88 including a programmable integrated circuit or microcontroller 104 (hereafter, controller 104), a multiplexer (MUX) 108, power circuitry 112, light-emitting diodes (LEDs) 114, 114' the disk drive connector 90 (FIG. 3), and the midplane connector 100 (FIG. 3). In general, the controller 104 is an electronic component such as an ASIC (application specific integrated circuit) or a PLD (programmable logic device). The controller 104 has a request signal input terminal for each ATA BCC 92 for receiving request signals from that ATA BCC 92 and a grant signal output terminal for each ATA BCC 92 for sending grant signals to that ATA BCC 92. The controller 104 also includes non-volatile memory (not shown) for storing information, such as data and software code.

The controller 104 is in electrical communication with the MUX 108 by signal line 106. The MUX 108 is a 2-to-1 multiplexer: one terminal of the MUX 108 is electrically connected to the ATA BCC A 92 by signal lines 94 and 110 for transmitting to and receiving ATA data communications from the ATA BCC A 92 and a second terminal is electrically connected to the other ATA BCC B 92' over signal lines 94' and 110' for transmitting to and receiving ATA data communications from the ATA BCC A 92'. In one embodiment, each terminal includes four signal lines for carrying two serial ATA data transmit signals (Tx+ and Tx−) and two serial ATA data receive signals (Rx+ and Rx−).

Through the MUX 108 the controller 104 controls which ATA BCC 92, 92' communicates with the ATA disk drive 84 by sending a select signal to the MUX 108 over signal line 106. In response to the select signal 106, the MUX 108 enables a communication path between one of the ATA BCCs 92, 92' and the ATA disk drive 84. (The forked dashed arrow passing through the MUX 108 indicates that the MUX 108 operates as a switch that enables or disables communication between each of the ATA BCCs 92 and the ATA disk drive 84.) The controller 104 is also in electrical communication with the LEDs 114 and with the midplane connector 100 for receiving request signals from and for transmitting grant signals to the ATA BCCs 92, 92' over the midplane 96 (FIG. 3) and signal lines 94, 94'.

As described above, the controller 104 uses request and grant signals to arbitrate between the ATA BCCs 92 for access to the ATA disk drive 84. More specifically, the controller 104 receives a request from one of the ATA BCCs 92, 92', the controller 104 replies by sending a grant signal (active low) to the requesting ATA BCC, if the other ATA BCC does not currently have control of the ATA disk drive 84.

Access to the ATA disk drive 84 can be maintained in at least two ways. Consider that the ATA BCC 92 that has requested and been granted access to the ATA disk drive 84. In one embodiment, the requesting ATA BCC 92 holds the request line low for the duration of the operation(s) between the requesting ATA BCC 92 and the ATA disk drive 84. While this request line is held low, requests from the other ATA BCC 92' are ignored. In another embodiment, the ATA BCC 92 communicates with the other ATA BCC 92', indicating when it has commenced and completed its operation (s), to ensure that the other ATA BCC 92' does not assert its request line until the requesting ATA BCC 92 completes its operation(s). In this instance, the requesting ATA BCC 92 can release the request line, and the grant line stays asserted to indicate that the MUX 108 is still directing communications to the requesting ATA BCC 92.

In conjunction with issuing the appropriate grant signal to the requesting ATA BCC, the controller 104 signals the MUX 108 to "switch" the ATA disk drive 84 to the requesting ATA BCC, that is, the select signal 106 from the controller 104 directs the MUX 108 to open a communication path between the ATA disk drive 84 and the requesting ATA BCC. Thus, the adapter board 88 achieves electrical compatibility with dual-port FC disk drives by giving a dual-port characteristic (or functionality) to the single port ATA disk drive 84.

Power passes from the power supplies 93, 93' (FIG. 3) over lines 95, 95', respectively, through the midplane 96 to the adapter board 88. In one embodiment, the power supplies 93, 93' provide 12 volts only to the enclosure slots. Other embodiments of enclosures provide a second voltage, e.g., 5 volts, with the 12 volt supply. For embodiments in which 12 volts only are supplied to the adapter board 88, the power circuitry 112 includes power conversion circuitry for converting the 12 volts only supply into a 5 volt source and a 12 volt source. The 5 volts power the circuitry of the adapter board 88 (e.g., the controller 104, the MUX 108), and the 12 volts pass through the disk drive connector 90 to power the ATA disk drive 84. The power circuitry 112 thus enables the ATA disk drive module 82 to achieve another electrical characteristic of FC disk drive modules, i.e., the capability of operating from a 12 volt only supply.

The power circuitry 112 also includes a current limiter that controls the ramp rate of voltage supplied to the ATA disk drive 84 when the ATA disk drive module 82 is inserted into the enclosure slot and plugged into the midplane 96. By controlling the ramp rate, the current limiter controls the instantaneous current drawn by the ATA disk drive module 82 when plugged into a powered midplane 96, thus avoiding a voltage drop on the midplane 96. This "soft-start" feature enables the ATA disk drive module 82 to be hot-plugged into the slot of an enclosure, thus achieving an electrical characteristic of FC disk drive modules. The power circuitry 112 also includes an over-current detector that can turn off the power supplied to the ATA disk drive 84 if the current drawn by the ATA disk drive module 82 exceeds a threshold.

The adapter board 88 achieves another electrical characteristic of FC disk drive modules by handling a fault output signal received from one of the ATA BCCs 92, 92' and by producing an activity output signal as described below. In one embodiment, the ATA BCCs 92, 92' control generation of the fault activity signal. Either ATA BCC 92, 92' can assert the fault output signal for the ATA disk drive 84. When generated, the fault output signal activates one of the LEDs 114. As described in more detail in connection with FIG. 6, a light pipe propagates the light emitted by the LED 114 to the front of the ATA disk drive module 82. In another embodiment, the controller 104 can also turn on the fault LED 114 under certain conditions, such as upon detection of an over current condition or malfunction of a voltage converter on the adapter board 88.

Code executing on the controller 104 simulates various blinking rates for the activity output signal so as to resemble corresponding blinking rates produced by an FC disk drive module. For example, a first blinking rate indicates that the ATA disk drive 84 is plugged in and not ready for access and a second blinking rate indicates that the ATA disk drive 84 is reading data; these blinking rates are the same as corresponding blinking rates (i.e., not ready and reading) for the FC disk drive module. When generated, the activity output signal activates the other of the LEDs 114'. A second light pipe propagates the light emitted by the LED 114' to the front of the ATA disk drive module 82. Accordingly, an operator familiar with a blinking LED of an FC disk drive module can recognize the blinking rate(s) of the LED 114' of the ATA disk drive module 82 to have the corresponding meanings.

Figure 5:
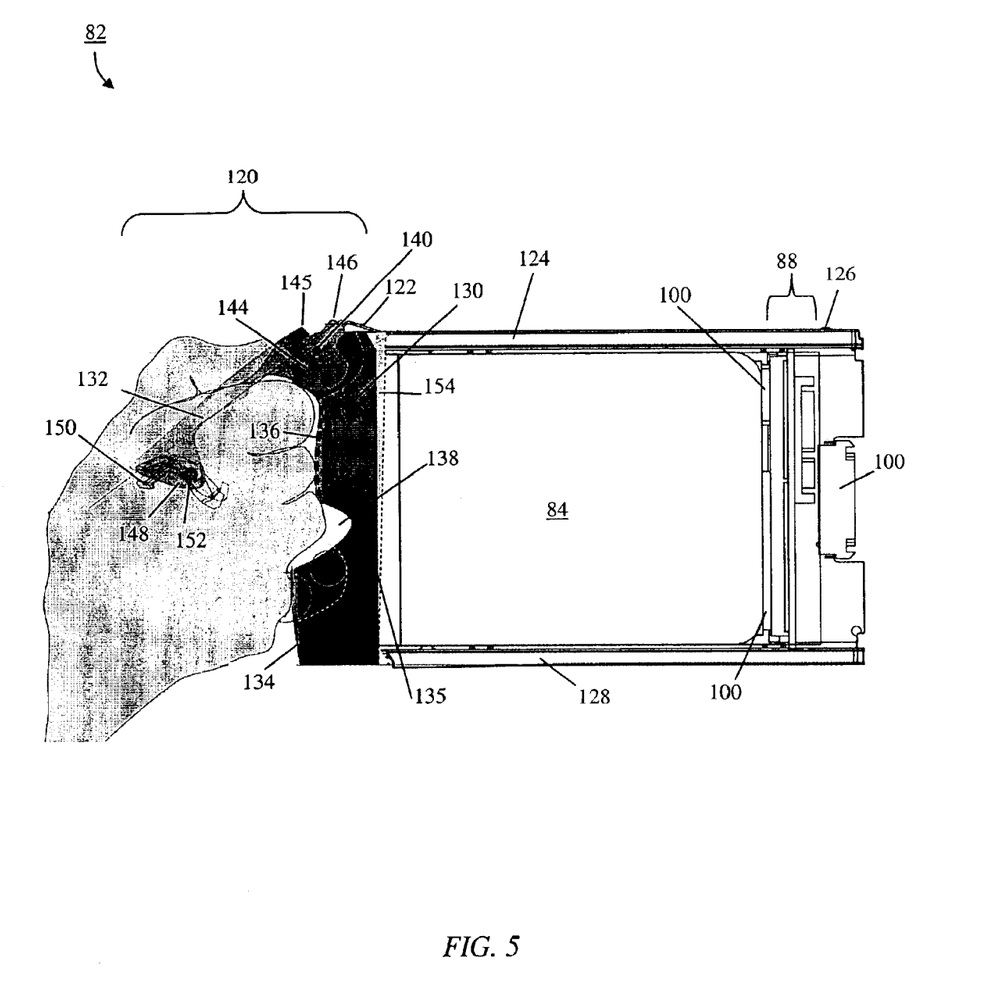
FIG. 5 is a side view of an embodiment of an ATA disk drive module of the invention, including the adapter board of FIG. 4, an ATA disk drive, and a bezel assembly.
Figure 6:
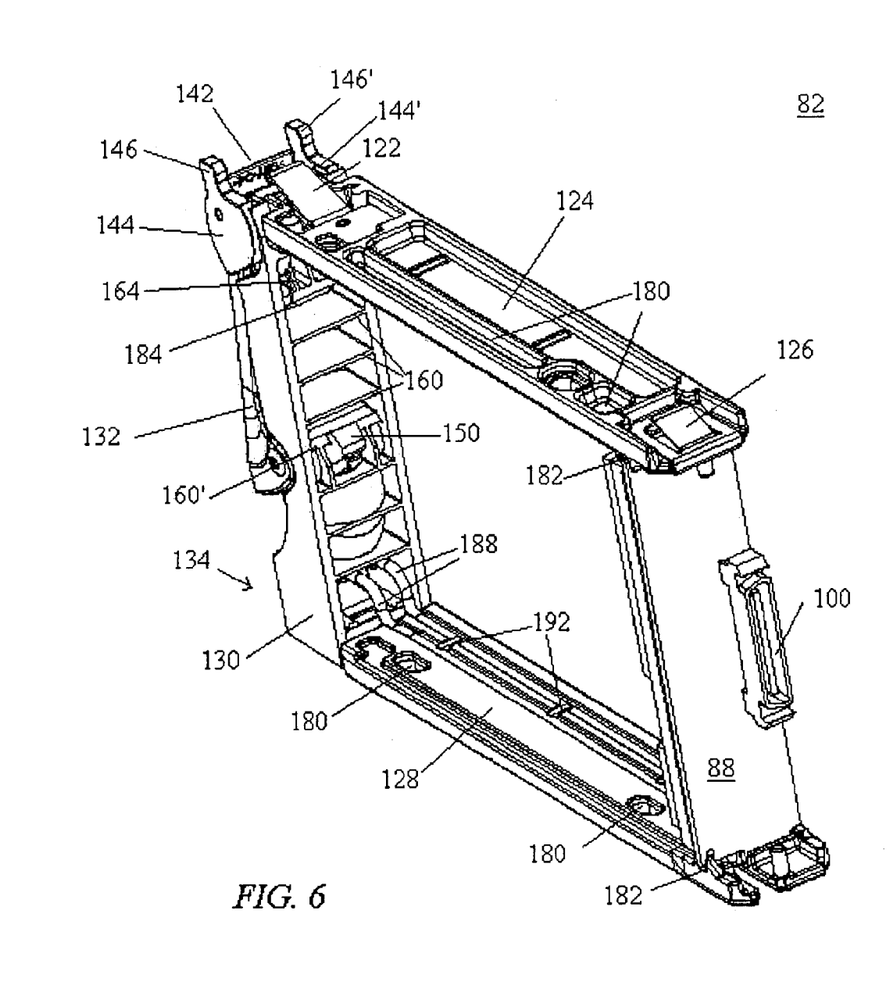
FIG. 6 is an isometric view of the ATA disk drive module of the invention.

FIG. 5 and FIG. 6 show mechanical embodiments of the ATA disk drive module 82 of FIG. 3. The ATA disk drive 84 is not shown in FIG. 6 to facilitate viewing of various facets of the ATA disk drive module 82. The ATA disk drive module 82 includes a carrier assembly comprised of a bezel assembly 120 and carrier sleds 124, 128. The carrier assembly has substantially the same physical dimensions, i.e., length, height, and width, as a carrier assembly for an FC disk drive module so that the ATA disk drive module 82 can closely fit within an enclosure slot constructed to receive an FC disk drive module.

The bezel assembly 120 includes a bezel 130 and an elongated handle-ejector 132 (hereafter, handle 132), and is constructed of a conductive material. In general, the construction material and operation of the bezel 130 and handle 132 give the ATA disk drive module 82 a similar appearance to an FC disk drive module. Examples of FC disk drive modules are described in U.S. patent application Ser. No. 09/894,804, titled "Disk Drive Module." Certain other features of the bezel assembly 120, such as the shape and length of the handle 132 and shape of the bezel 130, are uniquely associated with ATA disk drive modules so that an operator can readily distinguish an ATA disk drive module from an FC disk drive module.

In brief overview, an FC disk drive module has no equivalent to an adapter board 88 and, therefore, its carrier assembly provides sufficient spacing between the bezel and the FC disk drive through which an operator can reach his fingers to hold the bezel. For the ATA disk drive module 82 of the invention, the ATA disk drive 84 is mounted closer to the bezel 130 than its FC counterpart to accommodate the adapter board 88, thus leaving insufficient spacing behind the bezel assembly 120 for an operator's fingers. Unlike the design of the handle and bezel of the FC disk drive module, which encourage an operator to hold the FC module by the bezel, and not by the handle, the handle 132 of the bezel assembly 120 of the invention is designed for being held in a hand, and the back side 135 of bezel 130, which cannot be held by the operator, is substantially planar. Also, the back side 135 of the bezel 130 is open to permit air flow through the openings 136 to the ATA disk drive 84. Inside the bezel 130 are hollow regions separated by planar walls 160, and one of the planar walls 160, nearest the top of the bezel 130, has a plurality of spaced-apart ribs 164 (FIG. 6) extending upwards at an angle.

The handle 132 is pivotally attached to the bezel 130 at a pivot point 140 for rotational movement about the pivot point 140. At one end, the handle 132 has spaced-apart rounded shoulders 144, 144' and a protruding ridge 145. Each shoulder 144, 144' has a protruding ear 146, 146' integrally formed thereon. A planar tab-like section 142 is disposed between the ears 146, 146' of the shoulders 144, 144'. At its other end, the handle 132 has a knob 148 with a rounded periphery to fit comfortably in a hand that holds the handle 132. The knob 148 houses a latch mechanism 150 for locking the handle 132 in the closed position. The latch mechanism 150 is pivotally attached to the knob 148 for rotational movement about a pivot point 152. A hook end of the latch mechanism 150 passes through an opening in the front side 134 of the bezel 130 and locks onto a particular one of the planar walls 160, as shown in FIG. 6. An arcuate indentation 138 in the front side 134 of the bezel 130 receives the knob 148 when the handle 132 is in the closed position. The indentation 138 is sculptured to accommodate a finger of the operator's hand comfortably when the operator holds the ATA disk drive module 82 by the handle 132, as shown in FIG. 5.

Mounted between the carrier sleds 124, 128 are the ATA disk drive 84 and adapter board 88, the ATA disk drive 84 being mounted near the bezel assembly 120 and the adapter board 88 being mounted at the end of the carrier assembly that interfaces the midplane 96 (FIG. 3). Isolation pads, not shown, can be disposed between each carrier sled 124, 128 and the ATA disk drive 84 to dampen vibration. The ATA disk drive 84 is connected to the adapter board 88 by the disk drive connector 90 (shown in this embodiment as two separate connectors). The midplane connector 100 connected to one side of the adapter board 88 is appropriately located so that the connector 100 mechanically mates with a corresponding connector 102 (FIG. 3) on the midplane 96 when the ATA disk drive module 82 is slid into the enclosure slot of the data storage system. As described above, the location of the midplane connector 100 on the ATA disk drive module 82 corresponds positionally to the location of the midplane connector on an FC disk drive module.

Each carrier sled 124, 128 has openings 180 (FIG. 6) that align with openings in the ATA disk drive 84 for receiving fasteners that secure the ATA disk drive 84 to the carrier sleds 124, 128. Manufacturing standards determine the location of the openings in the ATA disk drive 84, and such openings differ in location depending upon the type of ATA disk drive being used (i.e., a SATA or PATA disk drive). In one embodiment, the carrier sled openings 180 are slotted to allow a manufacturer to align the carrier sleds 124, 128 with either type of ATA disk drive. The carrier sleds 124, 128 also have grooves 182 for receiving the adapter board 88.

A front spring 122 is mounted onto an outer surface of the carrier sled 124 at an end near the bezel assembly 120. The spring 122 is a leaf spring which is attached at one end to the outer surface of the carrier sled 124 by a fastener. The other end of the spring 122 extends from the outer surface of the carrier sled 124 and engages the interior of the enclosure slot to help retain the ATA disk drive module 82 in place within the slot. The carrier sled 124 also has a rear spring 126 mounted to the outer surface at an end near the adapter board 88. The position of the rear spring 126 on the carrier sled 124 corresponds to a dimple or groove in an engaging surface of the enclosure slot to help hold and push down the ATA disk drive module 82 towards the base of the enclosure chassis to minimize disk drive rotational vibration. Excessive rotational vibration can result in incorrect reading of data from and writing of data to the disk drive 84.

The carrier sled 128 has a pair of longitudinal grooves for holding a pair of light pipes 188. The grooves extend from one end of the carrier sled 128 adjacent to the bezel 130 to approximately where the adapter board 88 is mounted to the carrier sled 128. The light pipes 188 are connected to each other by locators 192, which keep the light pipes 188 aligned to each other and can facilitate positioning the light pipes 188 into the carrier sled grooves. At the bezel end, the light pipes 188 extend into a hollow region of the bezel 130 and align with openings in the bezel's front side 134. At the adapter board 88, the light pipes 188 align with the LEDs 114, 114' (FIG. 4). The light pipes 188 convey light emitted by the LEDs 114, 114' to the front side 134 of the bezel 130.

Figure 7A:
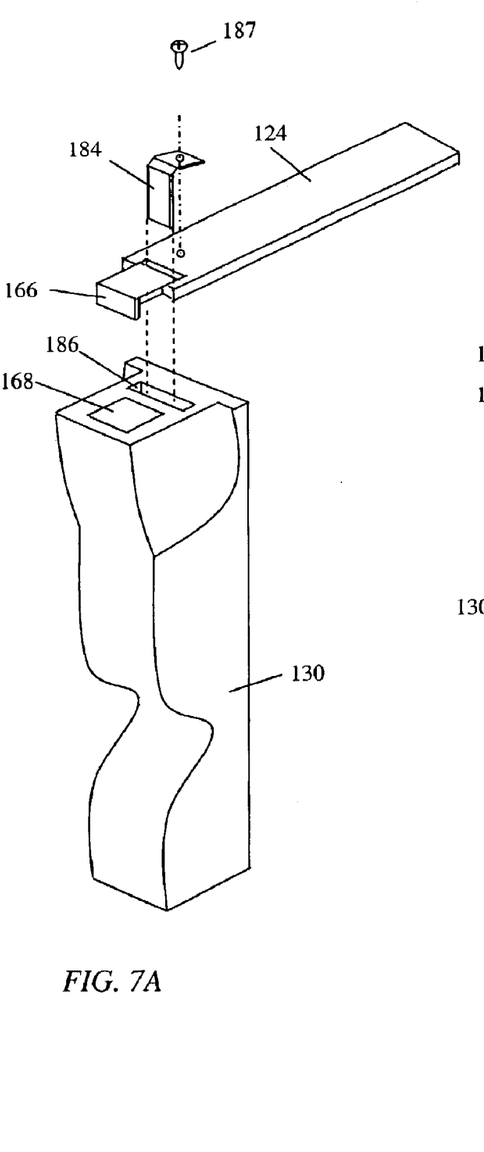
FIG. 7A is an isometric view of a carrier sled, including a resilient spring aligned for mounting to a bezel of the bezel assembly.
Figure 7B:
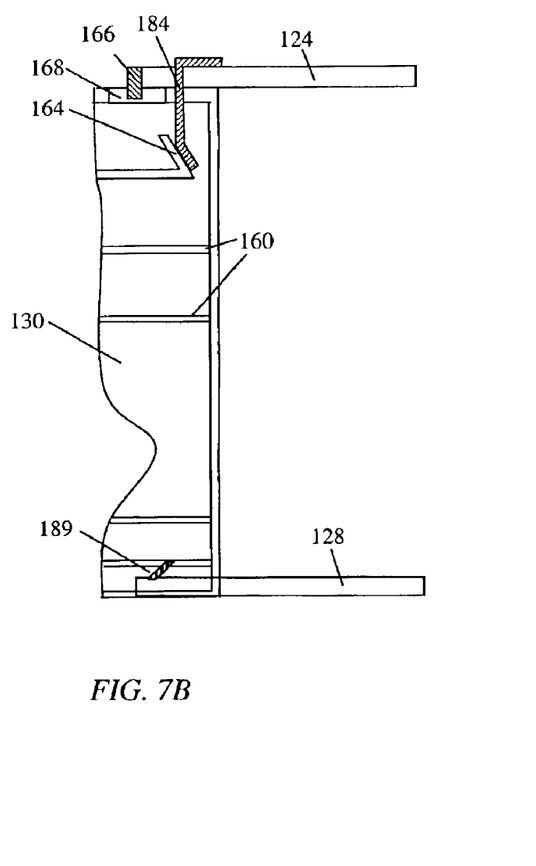
FIG. 7B is a side view of the resilient spring mounting the carrier sled to the bezel.

Referring to FIG. 7A and to FIG. 7B, the bezel 130 is mounted to one end of each carrier sled 124, 128, as described further below. For mounting to the bezel 130, the carrier sled 124 has a tab 166 that extends downwards from an inner surface of the carrier sled 124. The top of the bezel 130 is shaped to receive a portion of the carrier sled 124 and has a corresponding receptacle 168 for receiving the carrier sled tab 166. When the carrier sled 124 is attached to the bezel assembly 120, the length of the receptacle 168 permits forward and backward movement of the carrier sled tab 166 within the receptacle 168. A resilient spring 184 also connects the carrier sled 124 to the bezel 130. One end of the resilient spring 184 is fixed to the outer surface of the carrier sled 124 by a screw 187. With the first end so attached to the carrier sled 124, the second end of the resilient spring 184 projects through an opening 186 in a top surface of the bezel 130. A front surface of the resilient spring abuts the angled, spaced-apart ribs 164 of the bezel 130. These ribs 160 are angled to bend the abutting resilient spring 184 (FIG. 7B). The resilient nature of the resilient spring 184 attempts to return the bent portion of the spring into a straightened position, thus continuously applying a force against the ribs 164 of the bezel 130. When the bezel 130 is secured to the chassis of the enclosure, this force operates to urge the carrier assembly into the enclosure slot, thus providing a firm connection between the midplane connectors 100, 102 (FIG. 3). In addition to providing a full connector mate with the midplane 96, this force also accommodates manufacturing variations in the carrier assembly and chassis assembly.

With respect to mounting the bezel assembly 120 to the carrier sled 128, the carrier sled 128 has a tab 189 (FIG. 7B) that projects from an inner surface of the carrier sled 128. This tab snaps into an appropriately sized slot on the underside of the base of the bezel 130. The front spring 122, rear spring 126, resilient spring 184, carrier sled tabs 166, 189, and manner for mounting the bezel assembly 120 to the carrier sleds 124, 128 are more fully described in the U.S. patent application Ser. No. 09/894,804 identified above. These mounting mechanisms permit some flexible movement of the bezel 130 with respect to the carrier sled 124 and substantially no movement with respect to the carrier sled 128. The pivot point about which the bezel 130 rotates is the fixed connection between bezel 130 and the carrier sled tab 189. In FIG. 5, the range of flexible movement is illustrated by a gap 154 between the back side 135 of the bezel 130 and a vertical dashed line. The length of the receptacle 168 determines the range of flexible movement that can be traversed by the carrier sled tab 166, and accommodates manufacturing variations in the carrier assembly and bezel assembly 120.

Figure 8A:
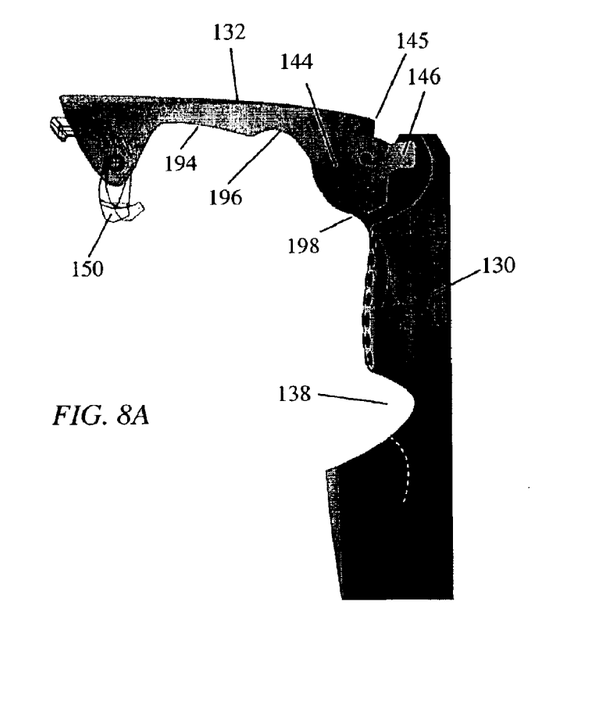
FIG. 8A is a side view of the bezel assembly with a handle in an open position.

FIG. 8A shows a side view of the bezel assembly 120 with the handle 132 in an open position. In addition to the various features of the bezel assembly 120 shown in FIG. 5 and FIG. 6, the side view of FIG. 8A shows inner surfaces 194, 196, and 198 of the handle 132. These surfaces 194, 196, 198 have curved shapes designed to present a comfortable interface with the hand of an operator carrying the ATA disk drive module 82. In particular, the surfaces are designed to eliminate pinching the hand of an operator who carries the ATA disk drive module 82 by the handle 132.

Figure 8B:
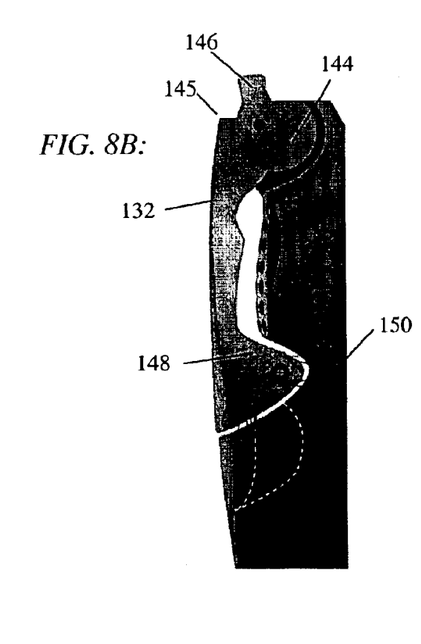
FIG. 8B is a side view of the bezel assembly with the handle in the closed position.

FIG. 8B shows a side view of the bezel assembly 120 with the handle 132 in the closed position. This view illustrates how the indentation 138 in the front surface 134 of the bezel 130 receives the knob 148 when the handle is in the closed position. In this embodiment, the front surface of the handle 132 is almost flush with the front side 134 of the bezel 130 when the handle 132 is latched to the bezel 130.

Figure 8C:
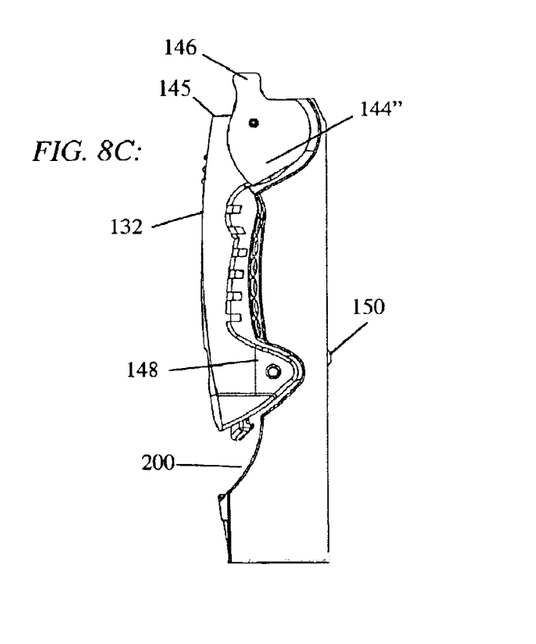
FIG. 8C is a side view of another embodiment of the bezel assembly with a handle in the closed position.

FIG. 8C shows another side view of the bezel assembly 120 with the handle 132 in the closed position. In addition to the various features shown in FIG. 5 and in FIG. 6, this view shows a different shape to a shoulder 144" of the handle 132 that avoids pinching the hand of an operator who is holding and carrying the ATA disk drive module 82 by the handle 132. In the embodiment shown, another indentation 200 in the front side 134 of the bezel 130 provides access to the latch mechanism 150.

Figure 8D:
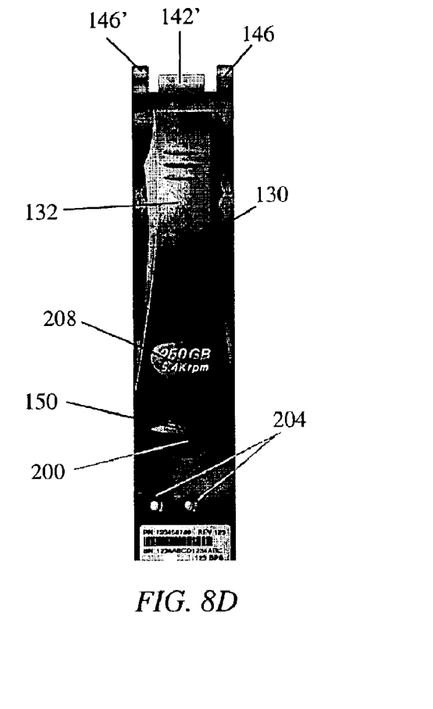
FIG. 8D is a front view of the bezel assembly of FIG. 8A with the handle in the closed position.

FIG. 8D shows a front view of the bezel assembly 120. Two light output ports 204 are inset in the front side 134 of the bezel 130. The location of these light output ports 204 correspond to the location of similar light sources of the corresponding FC disk drive module. The light output ports 204 emit light received through the light pipes 188, as described above in connection with FIG. 6.

Figure 9:
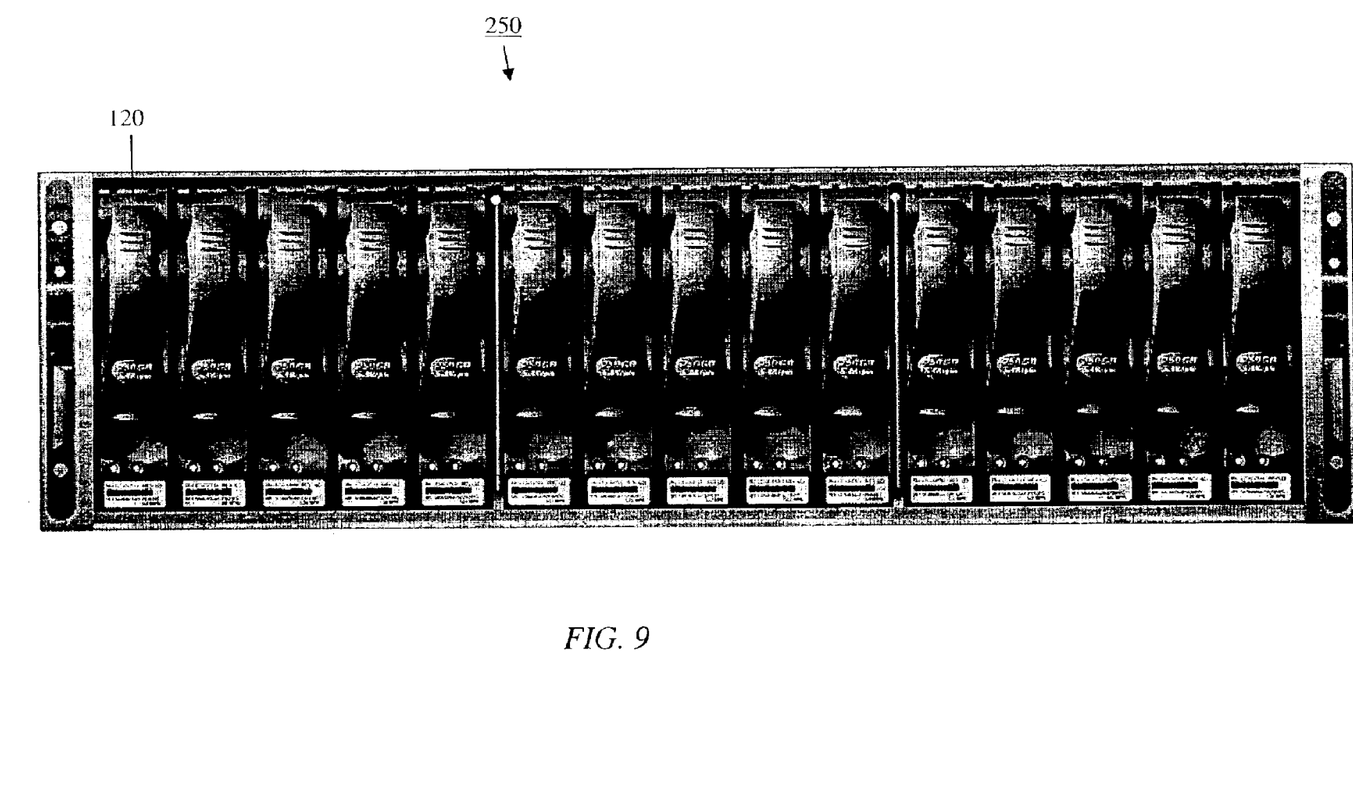
FIG. 9 is a front view of an enclosure with a plurality of installed ATA disk drive modules.

To insert the ATA disk drive module 82 into the enclosure slot, an operator holds the handle 132 of the bezel assembly 120 in one hand, as shown in FIG. 5, and with the other hand may support and direct the carrier assembly into the enclosure slot. Rails within the enclosure slot receive the carrier sleds 124, 128. With the handle 132 in an open position (e.g., at nearly a right angle with respect to the bezel 130), the ATA disk drive module 82 slides into the enclosure slot until the protruding ridge 145 contacts a front surface of the enclosure chassis. This front surface is an overhanging edge at the periphery of the enclosure slot. At this point, to insert the ATA disk drive module 82 further into the enclosure slot, the operator rotates the handle 132 toward the closed position. As a result, the protruding ears 146, 146' rotate to engage a back surface of the overhanging edge. As the operator applies more force to close the handle 132, the ears 146, 146' more strongly press against the back surface and urge the carrier assembly further into the enclosure slot so that the midplane connector 100 makes mechanical and electrical contact with the corresponding midplane connector 102 of the midplane 96. Closing the handle 132 also increases the pressure of the ribs 164 of the bezel 130 against the resilient spring 184. Because the resilient spring 184 wants to return to its original form, it slightly urges the carrier assembly further into the enclosure slot, thus providing a constant force for maintaining the connection between the midplane connectors 100, 102. When the handle 132 is fully closed, the hook end of the latch mechanism 150 grasps the wall 160 at the back side of the bezel 130 to lock the handle 132 in place. Populating an enclosure with ATA disk drive modules 82 produces an enclosure 250 as shown in FIG. 9.

To remove the carrier assembly from the enclosure slot, an operator inserts a finger underneath the latch mechanism 150 and lifts the latch mechanism upwards to release the hook end of the latch 150 mechanism from a wall 160 at the back side 135 of the bezel 130. With the release of the latch mechanism 150, the resilient spring 184, which has been operating to urge the carrier assembly into the enclosure slot, now operates to urge the carrier assembly out of the enclosure slot. The operator can then lift, grasp, and rotate the handle 132 and draw the carrier assembly out of the enclosure slot. When the operator rotates the handle 132 to approximately 36 degrees with respect to the bezel 36, the carrier assembly can be drawn from the slot without the protruding ears 146, 146' striking the overhanging edge of the enclosure chassis.

While the invention has been shown and described with reference to specific preferred embodiments, it should be understood by those skilled in the art that various changes in form and detail may be made therein without departing from the spirit and scope of the invention as defined by the following claims.

What is claimed is:

1. An Advanced Technology Attachment (ATA) disk drive module for use in a data storage system having an enclosure with slots constructed to receive Fibre Channel disk drive modules, the ATA disk drive module comprising:
    an ATA disk drive;
    an adapter board connected to the ATA disk drive; and
    a carrier assembly including spaced apart carrier sleds mounted to the ATA disk drive and to the adapter board, the spaced apart carrier sleds having mechanical dimensions that enable the carrier assembly to slide into an enclosure slot constructed to receive a Fibre Channel disk drive module, the adapter board providing an electrical interface and a mechanical interface between the ATA disk drive and a midplane of the enclosure when the carrier assembly is inserted in the enclosure slot and the ATA disk drive module is plugged into the midplane.

2. The ATA disk drive module of claim 1, further comprising a bezel assembly and a resilient spring connecting the bezel assembly to one of the spaced apart carrier sleds, the bezel assembly including a bezel and an elongated handle used to carry the ATA disk drive module, the elongated handle including a first end having a tab extending therefrom and a second end having a latch mechanism, the first end pivotally attached to one end of the bezel for rotational movement about an axis between an open position and a closed position, the tab engaging a front edge of the enclosure slot when the handle is rotated to the closed position, latch mechanism locking the handle in the closed position to secure the bezel to the front edge of the enclosure slot, the resilient spring urging the carrier assembly towards the midplane when the bezel is secured to the front edge of the enclosure slot.

3. The ATA disk drive module of claim 1, wherein the adapter board has a first side with an electrical connector attached thereon that aligns with a connector on the midplane of the enclosure when the ATA disk drive module is inserted into the slot of the enclosure.

4. The ATA disk drive module of claim 1, wherein the adapter board includes current limiting circuitry to enable insertion of the ATA disk drive module into the slot of the enclosure while power is being supplied to the midplane.

5. The ATA disk drive module of claim 1, further comprising switching means for selectively controlling information flow between the ATA disk drive and one of a plurality of control boards.

6. The ATA disk drive module of claim 1, further comprising power supply means for producing a second voltage level from a voltage received from the midplane.

7. The ATA disk drive module of claim 1, further comprising a controller for producing a signal that activates an LED on the adapter board.

8. The ATA disk drive module of claim 7, further comprising a light pipe embedded in a groove of one of the carrier sleds, the light pipe conveying the light of the activated LED to an opposite end of the one carrier sled.

9. An adapter board for enabling an ATA disk drive module to be used in a data storage system having an enclosure with slots constructed to receive Fibre Channel disk drive modules, the adapter board comprising:
    a first electrical connector attached to a first surface of the adapter board for connecting to an ATA disk drive and a second electrical connector attached to an opposite surface of the adapter board for connecting to a midplane of the enclosure, the second electrical connector on the opposite surface of the adapter board aligning with a corresponding connector on the midplane when an ATA disk drive module comprised of the ATA disk drive and adapter board is inserted into a slot of the enclosure; and
    switching means for selectively controlling information flow between the ATA disk drive and one of a plurality of control boards connected to the midplane.

10. The adapter board of claim 9, further comprising current limiting circuitry to permit insertion of the ATA disk drive module is inserted into the slot of the enclosure while power is being supplied to the midplane.

11. The adapter board of claim 9, further comprising power supply means for producing a second voltage level from a voltage received from the midplane.

12. The adapter board of claim 9, further comprising a controller for producing a signal that activates an LED on the adapter board.

13. An Advanced Technology Attachment (ATA) disk drive module for use in a data storage system having an enclosure with slots constructed to receive Fibre Channel disk drive modules, the ATA disk drive module comprising:
    a carrier sled;
    an ATA disk drive connected to the carrier sled; and
    a bezel assembly including a bezel and an handle used to carry the ATA disk drive module, the handle including a first end having a tab extending therefrom and a second end having a latch mechanism, the first end pivotally attached to one end of the bezel for rotational movement about an axis between an open position and a closed position, the tab engaging a front edge of the enclosure slot when the handle is rotated to the closed position, latch mechanism locking the handle in the closed position to secure the bezel to the front edge of the enclosure slot; and
    a resilient spring connecting the bezel assembly to the carrier sled, the resilient spring urging the carrier assembly towards the midplane when the bezel is secured to the front edge of the enclosure slot.

14. The ATA disk drive module of claim 13, wherein the bezel has a front surface with an indentation for receiving the second end of the handle when the handle is in the closed position and for receiving a portion of a hand of an operator when the handle is in the open position and being held in the hand.

15. The ATA disk drive module of claim 13, wherein the bezel has a front surface with a plurality of openings therein for conducting air flow.

16. The ATA disk drive module of claim 13, wherein the handle has a curved back surface for receiving a portion of a hand of an operator when the handle is in the open position and being held in the hand.

17. A bezel assembly for a disk drive module, comprising:

a bezel for attaching to a carrier sled of the disk drive module;

an elongated handle used to carry the disk drive module, the elongated handle including a first end having a tab extending therefrom and a second end having a latch mechanism, the first end being pivotally attached to one end of the bezel for rotational movement about an axis between an open position and a closed position, the tab engaging a front edge of the enclosure slot when the handle is rotated to the closed position, latch mechanism locking the handle in the closed position to secure the bezel to the front edge of the enclosure slot; and a resilient spring connecting the bezel to the carrier sled, the resilient spring urging the disk drive module into the enclosure slot when the bezel is secured to the front edge of the enclosure slot.

18. The bezel assembly of claim 17, wherein the bezel has a front surface with an indentation for receiving the second end of the handle when the handle is in the closed position and for accommodating a portion of a hand of an operator when the handle is in the open position and being held in the hand.

19. The bezel assembly of claim 17, wherein the bezel has a front surface with a plurality of openings therein for conducting air flow handle.

20. The bezel assembly of claim 17, wherein the handle has curved back surface for receiving a portion of a hand of an operator when held in the hand.

* * * * *

UNITED STATES PATENT AND TRADEMARK OFFICE
CERTIFICATE OF CORRECTION

PATENT NO.         : 6,850,410 B2
APPLICATION NO. : 10/400333
DATED                  : February 1, 2005
INVENTOR(S)       : Peeke et al.

Page 1 of 1

It is certified that error appears in the above-identified patent and that said Letters Patent is hereby corrected as shown below:

In the claims:

In claim 2, column 11, line 48, after "position," and before "latch" insert -- the --.

In claim 10, column 12, line 27, delete "is inserted".

In claim 13, column 12, line 49, after "position," and before "latch" insert -- the --.

Signed and Sealed this

Twelfth Day of September, 2006

JON W. DUDAS
*Director of the United States Patent and Trademark Office*